(12) United States Patent
Cook et al.

(10) Patent No.: US 11,194,835 B2
(45) Date of Patent: Dec. 7, 2021

(54) COMMUNICATION SYSTEM AND METHOD FOR PROVIDING DATA VISUALIZATIONS

(71) Applicant: TE CONNECTIVITY CORPORATION, Berwyn, PA (US)

(72) Inventors: Andrew Cook, Hummelstown, PA (US); Jon J. Girardot, Hershey, PA (US); Earl F. Artz, Mechanicsburg, PA (US); Brad A. Gaston, Mechanicsburg, PA (US); Randall J. Huggins, Hummelstown, PA (US)

(73) Assignee: TE CONNECTIVITY SERVICES GMBH, Schaffhausen (CH)

( * ) Notice: Subject to any disclaimer, the term of this patent is extended or adjusted under 35 U.S.C. 154(b) by 148 days.

(21) Appl. No.: 16/154,180

(22) Filed: Oct. 8, 2018

(65) Prior Publication Data

US 2020/0110829 A1    Apr. 9, 2020

(51) Int. Cl.
*G06F 3/048*    (2013.01)
*G06F 16/26*    (2019.01)
*G06Q 10/06*    (2012.01)
*G06F 3/0486*   (2013.01)
*G06F 16/25*    (2019.01)

(52) U.S. Cl.
CPC ............ *G06F 16/26* (2019.01); *G06F 3/0486* (2013.01); *G06F 16/252* (2019.01); *G06Q 10/0639* (2013.01)

(58) Field of Classification Search
CPC .... G06F 16/283; G06F 3/048; G06F 3/04883; G06F 9/542; H04N 21/4753
See application file for complete search history.

(56) References Cited

U.S. PATENT DOCUMENTS

| | | | | |
|---|---|---|---|---|
| 2004/0028375 | A1* | 2/2004 | Kim | H04N 21/4753 386/230 |
| 2008/0201467 | A1* | 8/2008 | Delany | G06F 9/542 709/224 |
| 2010/0231752 | A1* | 9/2010 | Lodge | G09B 21/001 348/231.4 |
| 2014/0053091 | A1* | 2/2014 | Hou | G06F 3/04883 715/769 |
| 2014/0082025 | A1* | 3/2014 | Armitage | G06F 16/283 707/802 |
| 2014/0281990 | A1* | 9/2014 | Gu | G08B 13/19684 715/719 |
| 2015/0262396 | A1* | 9/2015 | Devarajan | G06F 3/0486 345/440.1 |

* cited by examiner

*Primary Examiner* — Haoshian Shih

(57) ABSTRACT

A method includes, responsive to receiving a user login, displaying a user interface on a display screen of a computing device. The user interface includes a menu listing multiple pills that are associated with different performance topics. The user interface includes a large work space and multiple small work spaces. The method includes receiving a first data visualization and a second data visualization from a visualization database remote from the computing device via a network. The first data visualization represents the performance topic associated with a first pill of the pills, and the second data visualization representing a performance topic associated with a second pill of the pills. The method also includes concurrently displaying the first data visualization within a first small work space of the small work spaces and the second data visualization within the large work space.

13 Claims, 8 Drawing Sheets

COMMUNICATION SYSTEM AND METHOD FOR PROVIDING DATA VISUALIZATIONS

BACKGROUND OF THE INVENTION

The subject matter herein relates generally to communication systems and methods for providing data visualizations, such as data metrics and analytical dashboards to users.

Data analytics are utilized in various industries to provide objective techniques for tracking performance and goals. Due to an increase in the amount of information available, it has become increasingly difficult to parse the information to locate information that is relevant to a specific topic or matter. For example, known programs list pre-built data visualizations or content, such as data metrics and analytical dashboards, within file directories that may be categorized or organized by title and/or date. A user that aspires to consume data visualizations relevant to a specific topic, such as female hiring by a business, may be forced to inefficiently browse through one or more file directories containing dozens or hundreds of pre-built data visualizations to try to locate a couple of relevant data visualizations. Furthermore, some of the data visualizations within the directory that the user has to search through may not even be available for viewing by the specific user based on employment status (e.g., security clearance, employment department, or the like), but the known programs optionally may not parse such unavailable data visualizations from the directory.

The disorganized and inefficient navigation through known programs for users in order to access relevant data visualizations may reduce the usefulness of data analytics for enhancing performance gains and productivity. For example, some users may be dissuaded from utilizing data analytics, and other users may not be able to timely locate all of the relevant data visualizations.

Furthermore, some known web-based data analytics programs are only able to provide a single data visualization at a time on a webpage or browser window. In order to access multiple data visualizations at the same time in order to compare the information and make determinations, a user may have to open multiple browser windows or tabs. There may be delays and/or errors in the way that the data visualizations are displayed on the multiple windows or tabs due to rendering issues. Furthermore, the display screen may become congested and cluttered by the multiple different windows or tabs open.

There is a need for more organized and efficient access to pre-built data visualizations.

BRIEF DESCRIPTION OF THE INVENTION

In an embodiment, a method is provided that includes, responsive to receiving a user login, displaying, via one or more processors, a user interface on a display screen of a computing device. The user interface includes a menu listing multiple pills that are associated with different performance topics. The user interface also includes a large work space and multiple small work spaces each having a smaller area than the large work space. The large work space and the small work spaces are spaced apart from the menu. The method includes receiving a first data visualization and a second data visualization from a visualization database remote from the computing device via a network. The first data visualization represents the performance topic associated with a first pill of the pills, and the second data visualization representing a performance topic associated with a second pill of the pills. The method also includes concurrently displaying the first data visualization within a first small work space of the small work spaces and the second data visualization within the large work space.

In an embodiment, a communication system is provided that includes a computing device and a server system. The computing device includes display screen and an input device to receive a user login that identifies a specific user. The server system is communicatively connected to the computing device through a network. The server system includes one or more processors and a storage medium that is configured to store program instructions executable by the one or more processors. The one or more processors transmit a user interface to the computing device via the network for display on the display screen responsive to receiving the user login. The user interface includes a menu listing multiple pills that are associated with a predefined subset of performance topics designated as relevant to the user. The user interface also includes multiple work spaces spaced apart from the menu. The work spaces have predefined sizes and locations. The one or more processors retrieve a first data visualization and a second data visualization from a visualization database remote from the computing device and transmit the first and second data visualizations to the computing device via the network. The first data visualization represents the performance topic associated with a first pill of the pills, and the second data visualization represents a performance topic associated with a second pill of the pills. The computing device concurrently displays the first and second data visualizations on the display screen. The first data visualization is displayed within a first work space of the work spaces on the user interface, and the second data visualization is displayed within a second work space of the work spaces.

In an embodiment, a non-transitory computer readable storage medium is provided that includes computer executable code to transmit a user interface to a computing device via a network responsive to receiving a user login for displaying the user interface on a display screen of the computing device. The user interface includes a menu listing multiple pills that are associated with different performance topics. The user interface also includes a large work space and multiple small work spaces each having a smaller area than the large work space. The large work space and the small work spaces are spaced apart from the menu. The storage medium includes computer executable code to retrieve a first data visualization and a second data visualization from a visualization database remote from the computing device. The first data visualization has a data metric representing the performance topic associated with a first pill of the pills. The second data visualization has an analytical dashboard representing a performance topic associated with a second pill of the pills. The analytical dashboard includes a collection of multiple data points. The storage medium also includes computer executable code to transmit the first and second data visualizations to the computing device via the network for concurrent display of the data metric within a first small work space of the small work spaces on the user interface and the analytical dashboard within the large work space on the user interface.

DETAILED DESCRIPTION OF THE INVENTION

Figure 1:
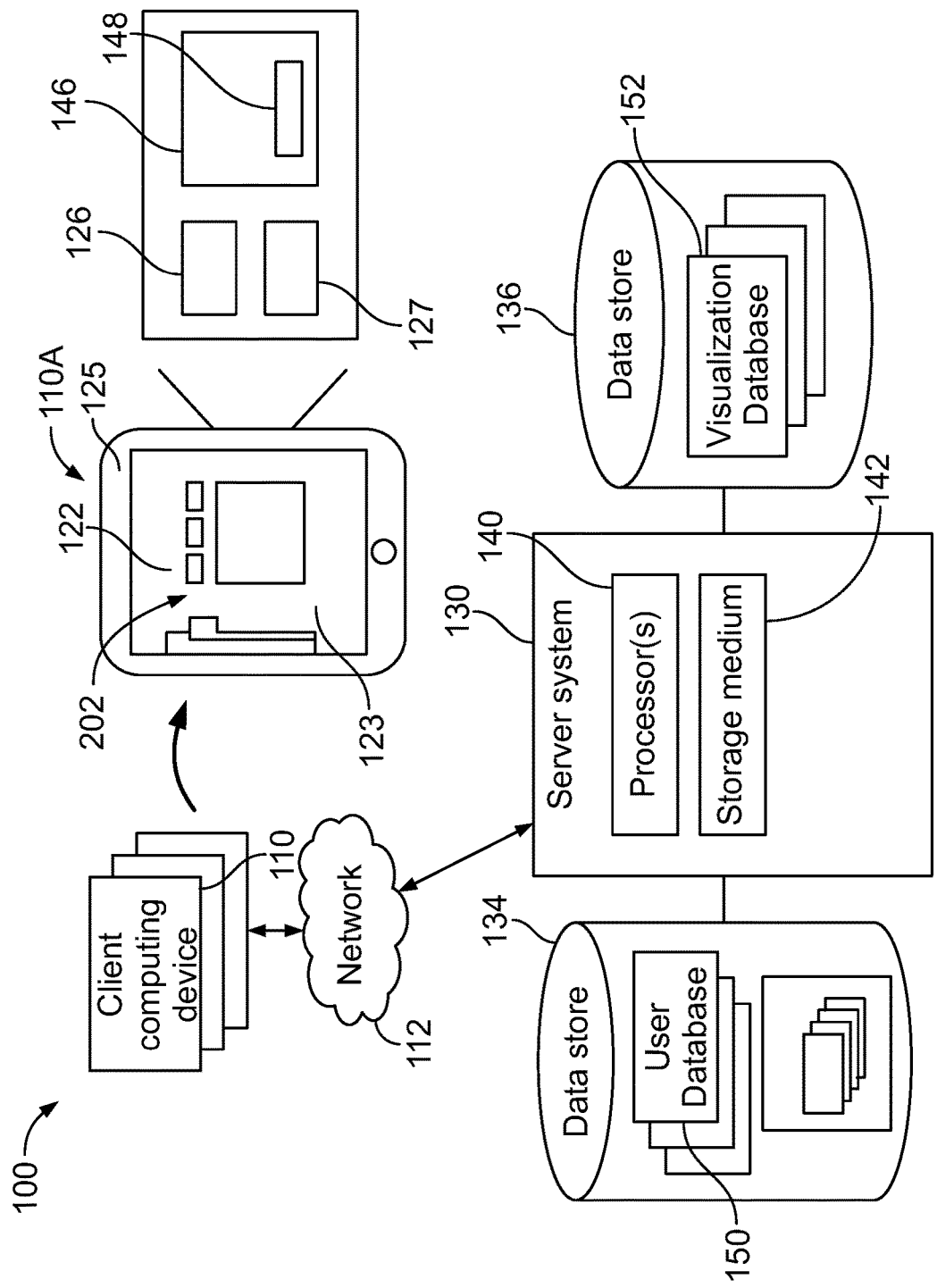
FIG. 1 is a block diagram illustrating a communication system formed in accordance with one or more embodiments described herein.

FIG. 1 is a block diagram illustrating a communication system 100 formed in accordance with one or more embodiments described herein. The communication system 100 includes one or more client computing devices 110 that are capable of communicating over a network 112 with a server system 130. The server system 130 may include one or more web servers and/or application servers. The server system 130 may host a web application and have the tools, application program interfaces (APIs), and scripts, among other things, that may be used for the web application. In some embodiments, a web application includes a web site or web page that allows a user to view data visualizations, which are graphical representations of information. Data visualizations may include data metrics, which are a single type of data (e.g., a number), and may also include more complex collections of multiple data points, arranged in tables, charts, graphs, or the like. As non-limiting examples, data visualizations may include data metrics, key point indicators (KPI), key data points, analytical dashboards, charts, graphs, tables, etc.

The server system 130 may be defined by only a single server or multiple different servers that communicate with one another and the client computing devices 110 over the network 112. The server system 130, in some embodiments, is configured to receive and interpret requests through the network 112 from the client computing devices 110 or, more specifically, from software applications 146 of the client computing devices 110. The server system 130 is also configured to respond to the requests and transmit data to the client computing devices 110 in a predetermined format (e.g., HTML, format). In some cases, the server system 130 and the client computing devices 110 may form a cloud-type computing system (e.g., public cloud, private cloud, or hybrid cloud).

The network 112 may be private or public. The network 112 represents any one or combination of multiple different types of networks, such as cable networks, the Internet, private intranets, local area networks, wide area networks, wireless networks, and the like. In a non-limiting specific embodiment, the network 112 may be the network of a business institution that allows access to authorized users (e.g., employees of the business) for providing data analytics relevant to the business (e.g., relevant to the scope of employment).

The client computing devices 110 (also referred to herein as computing devices 110) may be implemented as any number of types of computing devices. These devices may include, for instance, personal computers (PCs), tablet computers, notebook computers, laptop computers, smart phones, electronic book readers, and so forth. In FIG. 1, the illustrated computing device 110A is a tablet computer.

The client computing devices 110 may be configured to operate application programs, such as web browsers, mobile applications, or other software programs. One of the application programs operable on the client computing devices 110 is a data analytics program that is capable of retrieving data visualizations through the network 112 and concurrently displaying multiple data visualizations to a user. The data analytics program may be a platform that is a bridge or portal between two or more programs, such as a web-based platform and a data analytics server. In a non-limiting specific example, the data analytics program described herein may be a bridge between a web-based collaboration program such as Microsoft™ SharePoint™ and a data analytics server such as Tableau that enables the creation and storage of data visualizations.

The data analytics program efficiently categorizes and lists available, authorized performance topics to a user through the web-based collaboration program. Upon receiving a user input selecting one of the presented performance topics, the data analytics server is accessed to retrieve the appropriate data visualization that represents the selected performance topic and the data visualization is displayed on the client computing device. The data analytics program is able to concurrently display multiple different data visualizations in different discrete work spaces on a graphical user interface to enable the user to quickly and efficiently consume and analyze the information without opening up multiple windows or tabs and without enduring buffering or other rendering issues. Embodiments set forth herein may be implemented, at least in part, using an application program, a sub-application associated with the application program, or other software program having computer executable code. In at least one embodiment, all, or at least some, of the computer executable code is located remote from the client computing devices 110 at the server system 130.

In one or more embodiments, the server system 130 is configured to present a site (e.g., a website) that is capable of handling requests from one or more users and transmitting, in response, various pages (e.g., web pages) that are rendered at the client computing devices 110. As one example, the server system 130 may present an institutional website via the network 112 to a client computing device 110 to allow an authorized user access to view data analytics. In an alternative embodiment, the server system 130 may provide applications or sub-applications for the client computing devices 110 to download, store, and run locally, such that the client computing devices 110 may retrieve data analytics from remote sources via the network 112 according to the applications or sub-applications.

The server system 130 may include, among other things, one or more processors 140 and a non-transitory computer readable storage medium 142 (referred to herein as storage medium 142). The one or more processors 140 implement program instructions to perform the operations described herein. At least some of the program instructions may be stored in the storage medium 142. For example, the program instructions may control or direct the operations of the one or more processors. The server system 130 may be operably connected with one or more memories or data stores 134 and 136 that store information accessible to the server system 130.

In the illustrated embodiment, the data stores 134, 136 store information that is used to provide data analytics to a user interacting with a client computing device 110. For example, the data store 134 includes a user database 150 that contains account-specific information about users of the site. The user database 150 may include specific information about the users, such as user identities, employment status and/or position, employment department, security clearance, etc. The user database 150 may also include user preferences, which may be preset personalization settings selected by specific users. For example, the user preferences may include performance topics that a user identifies as a "favorite" performance topic. The performance topics represent subjects that can be described using data analytics, such as key performance indicators. The user database 150 optionally may also store user history information, such as the activity of the user (e.g., which performance topics the user views) during a session.

The data store 136 includes a visualization database 152 that contains pre-built data visualizations. The data visualizations are visual representations of data, and may include text, numbers, graphs, charts, tables, and the like. Some data visualizations may be shown as a single type of data (or a data point), such as a number, word, and/or symbol. Other data visualizations may be shown as arrangements of multiple data points, such as charts, graphs, tables, and the like. The visualization database 152 stores analytical dashboards, which are graphical representations of collections of data points. The analytical dashboards may be dynamic, rather than static, such that a user can navigate through an analytical dashboard to view different graphical representations of the data.

The storage medium 142 and/or at least one of the data stores 134, 136 may also store web content (user interfaces, text, pictures, and other content). The web content (e.g., data associated with the content) may be transmitted to client computing devices 110 in response to individual user login request designating a destination of such web content. For example, in response to a user successfully logging into the data analytics program and/or the network 112 from a client computing device 110, the server system 130 may transmit a user interface 202 to the client computing device 110 to be displayed on the client computing device 110 to enable the user to interact with the data analytics program. It is recognized that the various content may be stored at locations distributed between various data storage areas, geographic locations, file structures, recommendation services, e-commerce catalogs and the like.

During operation, the server system 130 maintains network sessions with various client computing devices 110. The one or more processors 140 respond to user login requests from the client computing devices 110 by accessing a user look-up table within the user database 150 or the storage medium 142 to verify the login request. Optionally, the one or more processors 140 may return an account authentication page to the client computing device 110 including at least one of (i) a sign-in credential field or (ii) a create new account option. Alternatively, the account authentication page is not transmitted because the user can be identified and verifies based on the specific client computing device 110 that the user is utilizing. Upon identifying and authenticating the user, the server system 130 establishes a network session with the client computing device 110, enabling the user to select from among a customized list of relevant performance topics to concurrently view multiple data visualizations on the user interface 202.

Each of the client computing devices 110 includes a display screen 122, an input device 123, one or more processors 126, and a computer-readable storage medium 127. The input device 123 on the illustrated tablet computer 110A of the client computing devices 110 is a touchscreen configured to identify and locate a touch from a user's finger or stylus, but the input device 123 on other client computing devices 110 may be a touchpad, a keyboard, a mouse, physical buttons, or the like. The display screen 122 is configured to display the graphical user interface 202, as well as various data visualizations concurrently on the user interface 202, as described herein. The display screen 122 is framed by a housing 125 of the client computing device 110. The user interacts with the content (e.g., the user interface 202) displayed on the screen 122 by manipulating the input device 123 to provide user inputs. For example, a user may touch virtual buttons shown on the touchscreen or may click one or more buttons of a computer mouse to enter user inputs.

The computer-readable storage medium 127 of the client computing device 110 may store program instructions or computer code for a display application 146 that renders and formats the user interface 202 on the display screen 122. In some embodiments, the computer-readable storage medium 127 may store program instructions or computer code for a sub-application 148. Optionally, the sub-application 148 may be a plug-in or extension that is executable within or by the display application 146.

FIGS. 2 through 7 show the display screen 122 of a client computing device 110 displaying various states of the user interface 202 of a data analytics program 204 during operation of the data analytics program 204 according to an embodiment. The data analytics program 204 may be or include an application program that can display the user interface 202 to occupy an entirety of a viewable area of the display screen 122. The various states of the user interface 202 shown in FIGS. 2 through 7 may be displayed during ordinary navigation of the data analytics program 204 by a user. The various states of the user interface 202 in FIGS. 2 through 7 may be supplied to the client computing device 110 by the server system 130 (shown in FIG. 1) via the network 112 (FIG. 1).

Figure 2:
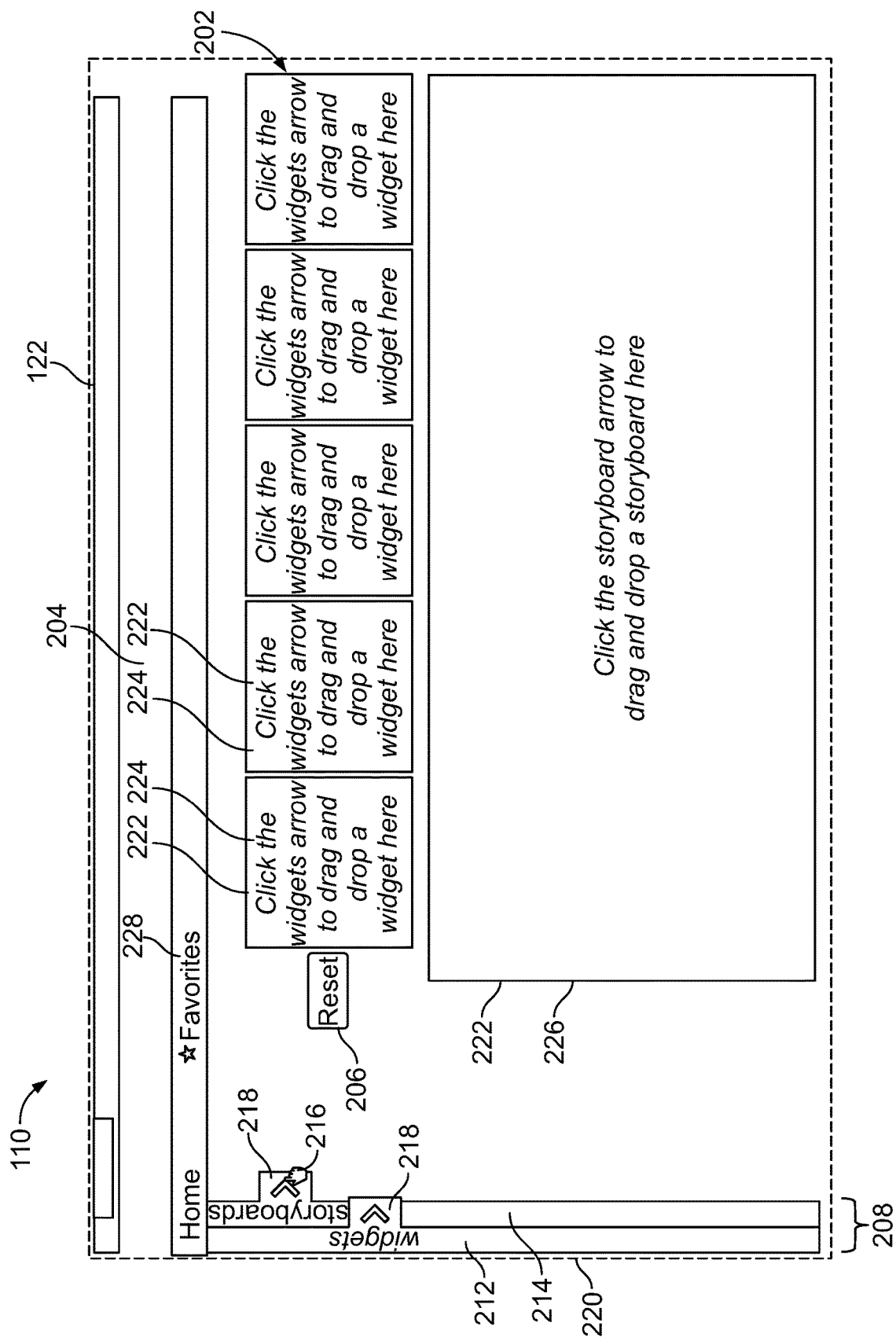
FIG. 2 shows a display screen of a client computing device of the communication system displaying a user interface in an initial or reset state according to an embodiment.

FIG. 2 shows the display screen 122 of the client computing device 110 displaying the user interface 202 in an initial or reset state according to an embodiment. For example, a user may experience the user interface 202 shown in FIG. 2 responsive to logging in to the data analytics program 204 for the first time and/or responsive to selecting a reset button 206 on the user interface 202. The user may log into the data analytics program 204 by inputting a user login (e.g., login request) via the input device 123 (shown in FIG. 1). The user login may involve selecting a link, entering a user name and/or password, or the like. The user login is communicated from the client computing device 110 to the server system 130. The server system 130 may transmit the user interface 202 to the client computing device 110 in a web page upon authenticating the user login, as described above with reference to FIG. 1. The client computing device 110 renders and displays the user interface 202 on the display screen 122.

The user interface 202 in FIG. 2 does not display any data visualizations. The user interface 202 includes a menu 208 that lists multiple pills 210 (shown in FIG. 3) that are associated with different performance topics. The pills 210 are virtual objects. The menu 208 includes a first flyout menu 212 and a second flyout menu 214 in the illustrated embodiment. The flyout menus 212, 214 are each displayable in a concealed state and an exposed state. The pills 210 listed within the flyout menus 212, 214 are visible in the exposed state, and are not visible in the concealed state. The flyout menus 212, 214 are individually controllable between the concealed and exposed states. Both of the flyout menus 212, 214 are in the concealed state in FIG. 2, which is indicated by the lack of pills 210 and the thin appearance of the menus 212, 214. The flyout functionality of the menus 212, 214 provides space savings and an un-cluttered user interface 202 when the menus 212, 214 are in the concealed state. For example, the menu 208 (e.g., the flyout menus 212, 214) is located along a side edge 220 of the display screen 122 in the illustrated embodiment, and occupies a small percentage of the viewable display area (e.g., less than 20% or less than 10%) when in the concealed state.

Each of the flyout menus 212, 214 may be configured to switch from the concealed state to the exposed state responsive to receiving a user input command that selects the respective flyout menu 212, 214. For example, a user may manipulate the input device 122 (shown in FIG. 1) to move a cursor 216 onto the flyout menu 212, 214, such as onto a tab 218 thereof, and may tap, click, or press the input device 122 to generate the input command. The flyout menus 212, 214 in the exposed state may return to the concealed state responsive to receiving a user input command on the flyout menus 212, 214 or upon expiration of a designated period of inactivity, such as 10 seconds or 30 seconds. The menu 208 may have only one or more than two flyout menus 212, 214 in another embodiment. Alternatively, the menu 208 may not be a flyout menu, but rather is a drop-down menu or the like.

The user interface 202 includes multiple work spaces 222 that have predefined sizes and locations. All of the work spaces 222 are discrete and separate, such that none of the work spaces 222 overlap. The work spaces 222 are spaced apart from the menu 208. The work spaces 222 are display areas within which data visualizations 302 (shown in FIG. 4) are displayed for viewing by the user. The work spaces 222 have rectangular shapes in the illustrated embodiment, but at least some of the work spaces 222 may have a different shape in an alternative embodiment.

The work spaces 222 may also represent drop zones. For example, the user interface 202 may have a drag-and-drop functionality that enables the pills 210 (shown in FIG. 3) to be dragged from the menu 208 to the work spaces 222. The user may provide an input command that selects and holds one of the pills 210 via holding a button on a mouse or providing an extended touch input on a touchscreen without removing a finger from the touchscreen. While the pill 210 is selected and held, the user may use the input device 123 to move the pill 210 to one of the work spaces 222 before releasing the pill 210 to "drop" the pill 210 into the work space 222. Upon dropping the pill 210 into the work space 222, a data visualization 302 that represents the performance topic associated with that specific pill 210 is retrieved and displayed on the work space 222 onto which the pill 210 is dropped.

The work spaces 222 may be arranged in different sizes, such as small work spaces 224 and large work spaces 226. In the illustrated embodiment, the user interface 202 has multiple small work spaces 224 and a single large work space 226. Each of the small work spaces 224 has a smaller area than the large work space 226. The small work spaces 224 may have uniform sizes and shapes. There are five small work spaces 224 in FIG. 2, but the user interface 202 may have more or less than five small work spaces 224 and/or more than one large work space 226 in an alternative embodiment. The user interface 202 is arranged with the small work spaces 224 in a lateral row above the large work space 226. The row of small work spaces 224 is disposed between the large work space 226 and a menu bar 228 of the user interface 202. The arrangement of the small work spaces 224 side by side in a row across the display screen 122 may enable the user to easily view and compare the data presented on the small work spaces 224, along with data presented on the large work space 226 below. The user interface 202 may have a different arrangement of work spaces 222 in another embodiment. For example, the small work spaces 224 may be aligned in a vertical column along a side of the large work space 226, such as between the large work space 226 and the menu 208.

Figure 3:
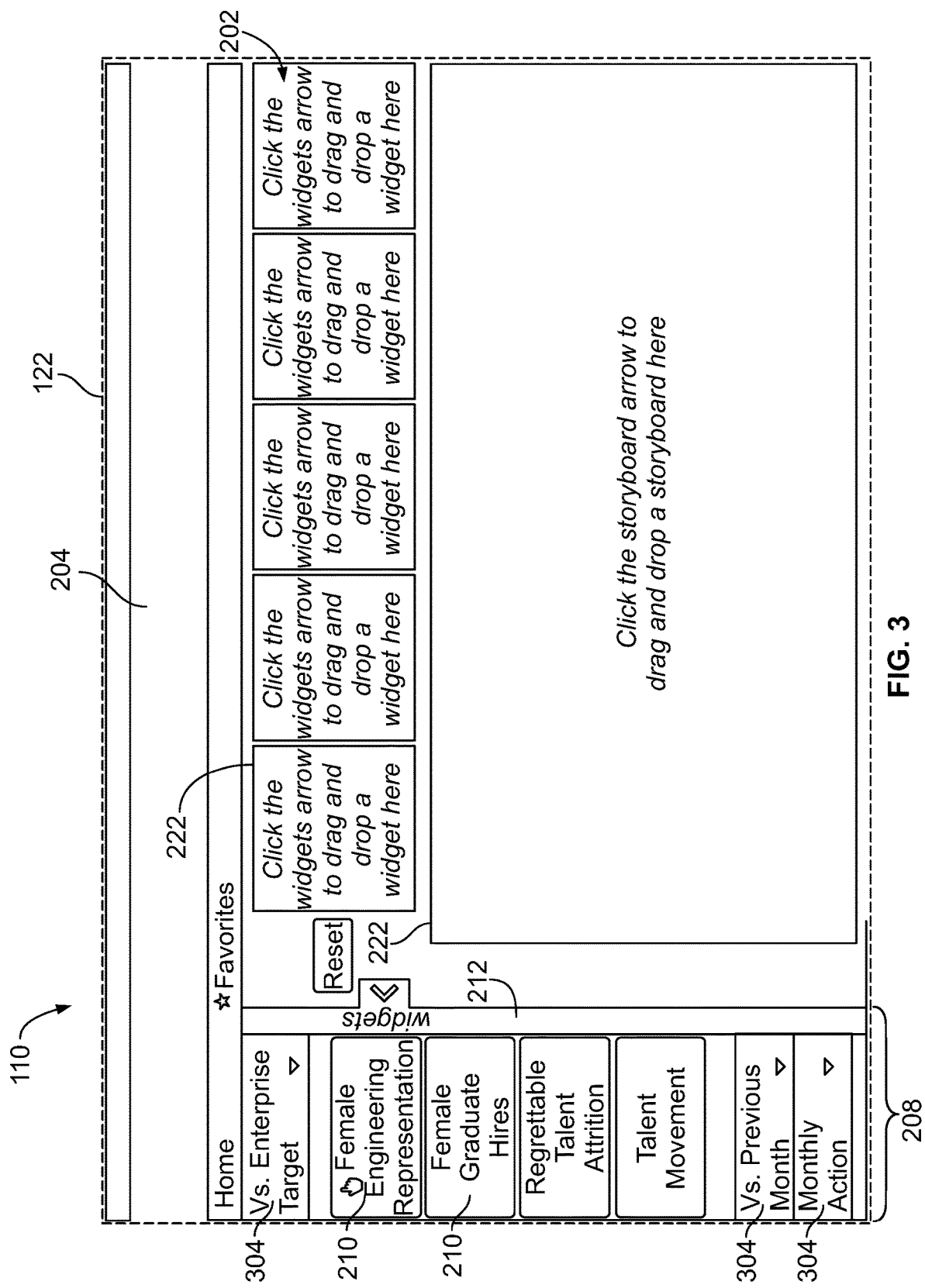
FIG. 3 shows the display screen of the client computing device displaying the user interface with a first flyout menu in an open, exposed state to show multiple pills.
Figure 4:
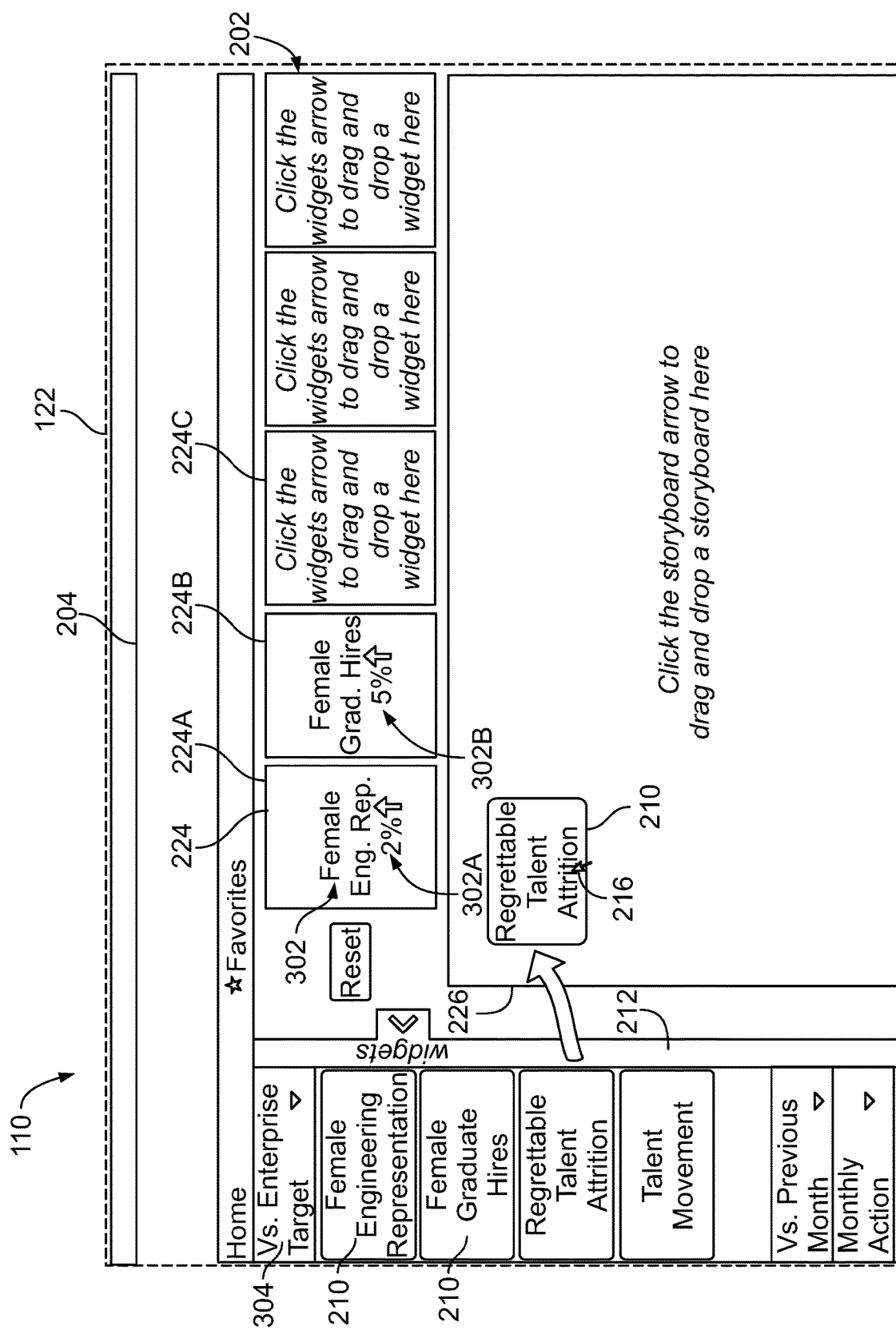
FIG. 4 shows the display screen of the client computing device displaying the user interface with the first flyout menu in the open, exposed state and multiple data visualizations on display.

In the illustrated embodiment, the first flyout menu 212 displays the work "Widgets," and the second flyout menu 214 displays the work "Storyboards." The pills 210 (shown in FIG. 3) within the first flyout menu 212 represent the "Widgets," and the pills 210 (shown in FIG. 5) within the second flyout menu 214 represent the "Storyboards." Optionally, each of the small work spaces 224 displays the phrase "Click the Widget arrow to drag and drop a Widget here" when the respective small work space 224 is not displaying a data visualization 302 (shown in FIG. 4). This message instructs a user to open the first flyout menu 212 (e.g., the widget menu) to the exposed state to reveal the pills 210, and to drag one or more of the pills 210 to the small work spaces 224. Furthermore, the large work space 226 in FIG. 2 displays the phrase "Click the Storyboard arrow to drag and drop a Storyboard here" when the large work space 226 is not displaying a data visualization 302. This message instructs a user to open the second flyout menu 214 (e.g., the storyboard menu) to the exposed state to reveal the pills 210, and to drag one or more of the pills 210 to the large work space 226. The user interface 202 is designed such that a user that is unfamiliar with the data analytics program 204 can figure out how to navigate the user interface 202 without reference to an instruction booklet or a teacher.

FIG. 3 shows the display screen 122 of the client computing device 110 displaying the user interface 202 with the first flyout menu 212 in the open, exposed state to show multiple pills 210. When the first flyout menu 212 is open the first flyout menu 212 may cover and obstruct the view of the second flyout menu 214 (shown in FIG. 2) that is in the concealed state. The pills 210 are virtual objects. The pills 210 are generally rectangular in FIG. 3, but may have different shapes in other embodiments. The pills 210 may be draggable and droppable, as described above. The pills 210 within the first flyout menu 212 optionally may be organized into multiple different headings 304. For example, three headings 304 are shown in FIG. 3 identified as "Vs. Enterprise Target," "Vs. Previous Month," and "Monthly Actions." The "Vs. Enterprise Target" heading 304 is selected in FIG. 3 to show four pills 210 categorized within that heading 304. The user may select a different one of the headings 304 (via the input device 123 shown in FIG. 1) to view different pills 210.

The pills 210 of the user interface 202 are associated with different performance topics that may be monitored and tracked using data analytics. In at least one embodiment, the performance topics associated with the pills 210 contained within the first flyout menu 212 may be represented by a single type of data. For example, the performance topics within the first flyout menu 212 may be represented by a data metric, such as a single word, number, and/or symbol, or a limited number of (e.g., less than 10) words, numbers, and/or symbols. In the illustrated embodiment, the performance topics associated with the pills 210 are written in text on the pills 210. Non-limiting examples of potential performance topics shown in FIG. 3 include "Female Engineering Representation," "Female Graduate Hires," "Regrettable Talent Attrition," and "Talent Movement." In order to view the data visualization 302 (shown in FIG. 4) that represents one of the performance topics, the user may select the corresponding pill 210 by dragging-and-dropping into one of the work spaces 222, single clicking or providing a single touch input on the pill 210, double-clicking or providing a double touch input on the pill 210, or the like.

The pills 210 that are displayed in the menu 208 are available to the user for selection and viewing the associated data. The specific pills 210 that are available may be personalized and customized based on the user login. For example, the pills 210 presented in the menu 208 may be associated with a predefined subset of performance topics that are designated as relevant to the user. The predefined subset is less than a total amount of performance topics that may be monitored and studied with data. Performance topics that are determined to be irrelevant and/or inappropriate for the user are not within the predefined subset and are not presented in the menu 208 by an associated pill 210. In a non-limiting example, the server system 130 (shown in FIG. 1) may be able to access pre-built data visualizations associated with 500 different performance topics, but less than 100 pills 210 are contained within the menu 208 presented to the user.

The relevancy and appropriateness of the performance topics for the user may be determined based on an employment status or position (e.g., manager, intern, engineer, etc.) of the user, an employment department (e.g., accounting, human resources, etc.) of the user, a security clearance (e.g., grade 1, grade 2, etc.) of the user, and/or the like. The user database 150 (shown in FIG. 1) may contain various information about the user that is logged into the data analytics program 204, such as name, employment position, department, security clearance, and the like. Responsive to receiving the user login, the one or more processors 140 of the server system 130 may access the user database 150 to access the user information. The server system 130 may determine or select the predefined subset of performance topics that are available to the user by comparing the performance topics to the user information. For example, for a user that is employed in a human resources department of a business, the server system 130 may include performance topics related to human resources issues within the predefined subset, and may not include performance topics related to finance or engineering. Furthermore, the predefined subset of performance topics presented to a manager may include more and/or different performance topics than the predefined subset presented to a lower level employee, even in the same department, because it may not be appropriate for the lower level employee to view some confidential information that is suited towards management. The server system 130 may transmit the user interface 202 to the client computing device 110 to include the pills 210 associated with the performance topics that are personalized to the user.

Therefore, the performance topics available to the user may be presented on-demand based on relevancy to the specific user. The data analytics program 204 therefore simplifies the browsing process for specific information by reducing the clutter and sheer number of documents and topics that a user has to parse through within a complex directory. The user interface 202 may only present pills 210 that are associated with performance topics considered relevant and appropriate to the specific user.

FIG. 4 shows the display screen 122 of the client computing device 110 displaying the user interface 202 with the first flyout menu 212 in the open, exposed state and multiple data visualizations 302 on display. A first small work space 224A of the small work spaces 224 displays a first data visualization 302A that represents the performance topic entitled "Female Engineering Representation." A second small work space 224B displays a second data visualization 302B that represents the performance topic entitled "Female Graduate Hires."

The first and second data visualizations 302A, 302B in FIG. 4 are data metrics that represent a limited amount of information, such as a single type of data. The data metrics may include key data points, key performance indicators, and/or the like. The first data visualization 302A shows "2%" and an "up" arrow, which may be interpreted to mean that female engineering representation is up 2% (or has increased 2%) relative to a control metric. Optionally, the control metric may be an "enterprise target," as indicated by the heading 304 under which the pills 210 are classified. The second data visualization 302B shows "5%" and an "up" arrow, which may be interpreted to mean that female graduate hires are up 5% (or have increased 5%) relative to the enterprise target or another control metric. The first and second data visualizations 302A, 302B are concurrently displayed on the user interface 202. For example, there is a time period during which both data visualizations 302A, 302B are being displayed. The first and second data visualizations 302A, 302B need not have the same display start time and/or display end time to be considered concurrently displayed. The concurrent display of multiple data visualizations 302 (e.g., 302A, 302B) on the user interface 202 enables the user to easily view and compare the data presented, without attempting to open and switch between multiple web pages and/or browser tabs. Known data analytics programs may not be able to concurrently display multiple data visualizations due to rendering issues, screen area constraints, or the like.

The data visualizations 302 displayed on the user interface 202 may be pre-built and stored remotely from the client computing device 110 on the visualization database 152. The server system 130 (shown in FIG. 1) accesses and retrieves the data visualizations 302 from the visualization database 152 upon receiving the user login and/or an input command, and the server system 130 transmits the data visualizations 302 to the client computing device 110 to be concurrently displayed on the user interface 202.

The cursor 216 in FIG. 4 is being controlled by the user via the input device 123 (shown in FIG. 1) to drag the pill 210 associated with the performance topic entitled "Regrettable Talent Attrition" to a third small work space 224C. According to at least one embodiment, once the cursor 216 drops the pill 210 in the third small work space 224C (or otherwise selects the pill 210), the client computing device 110 transmits an input command to the server system 130 (FIG. 1) that notifies the server system 130 of the selection of the pill 210 associated with the "Regrettable Talent Attrition" topic. The server system 130 accesses a third data visualization 302C (shown in FIG. 5) from the visualization database 152 (FIG. 1) that is specific to the selected performance topic, and transmits a response message to the client computing device 110 that includes the data visualization 302C. Responsive to receiving the response message, the client computing device 110 displays the data visualization 302C in the third small work space 224C of the user interface 202.

In an embodiment, all of the pills 210 within the first flyout menu 212 are associated with performance topics that can be represented as data metrics. For example, all of the data visualizations 302 that represent such performance topics are data metrics. Optionally, the small work spaces 224 are configured to only display data metrics. For example, the small work spaces 224 may be too small in size (e.g., area) to display more complex collections of data. Therefore, selection of a pill 210 within the first flyout menu 212 (via single click, double-click, drag and drop, etc.) results in the display of a data metric on one of the small work spaces 224. The large work space 226 according to an embodiment is configured to only display analytical dashboards (e.g., collections of data points) that are more complex than data metrics. In FIG. 4, if the user drops the pill 210 being dragged into the large work space 226, the client computing device 110 (e.g., the data analytics program 204 operating thereon) may be configured to interpret the drop as a cancellation and take no action, or may interpret the drop as a drop within an unoccupied small work space 224.

According to an embodiment, if the pill 210 associated with the performance topic entitled "Regrettable Talent Attrition" is selected via a method other than drag-and-drop, such as by a user touch input or by clicking a mouse, then the client computing device 110 displays the third data visualization 302C within the next available small work space 224. If all of the small work spaces 224 are occupied by data visualizations 302, then the client computing device 110 may replace one of the current data visualizations 302 with the newly selected third data visualization 302C.

Figure 5:
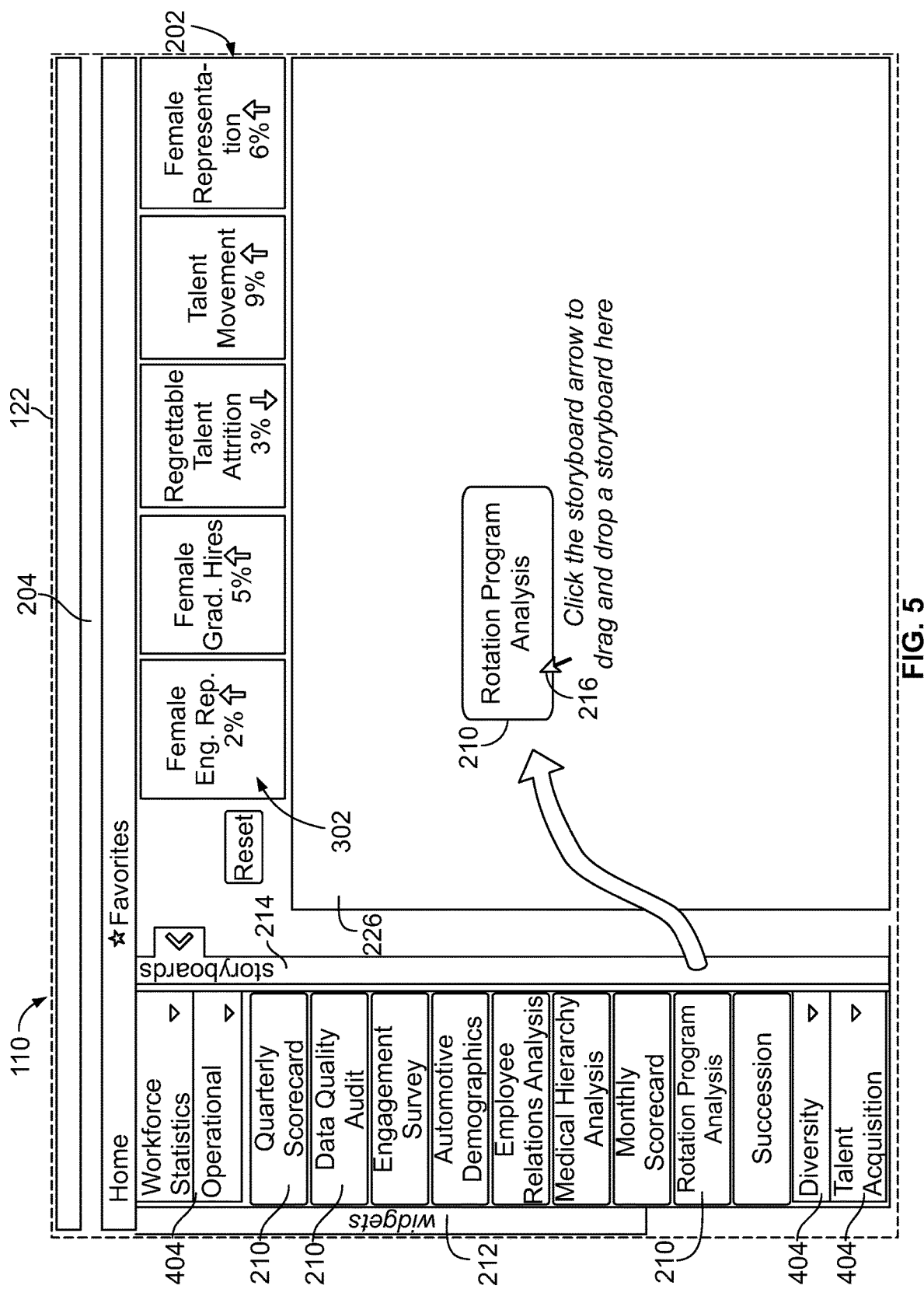
FIG. 5 shows the display screen of the client computing device displaying the user interface with a second flyout menu in the open, exposed state to show multiple pills.

FIG. 5 shows the display screen 122 of the client computing device 110 displaying the user interface 202 with the second flyout menu 214 in the open, exposed state to show multiple pills 210. The pills 210 within the second flyout menu 214 are different than the pills 210 within the first flyout menu 214. For example, the pills 210 in the second flyout menu 214 may be associated with performance topics that are represented by analytical dashboards (e.g., collections of data points). The pills 210 in the second flyout menu 214 may be categorized under multiple different headings 404, similar to the first flyout menu 212. Furthermore, the performance topics associated with the pills 210 contained within the second flyout menu 214 represent a portion of the predefined subset of performance topics that are designated as relevant to the user. For example, the performance topics within the predefined subset that are represented as data metrics are organized within the first flyout menu 212, and the performance topics within the predefined subset that are represented as analytical dashboards are organized within the second flyout menu 214.

In FIG. 5, a pill 210 associated with the performance topic entitled "Rotation Program Analysis" is being dragged by the cursor 216 into the large work space 226. Upon dropping or releasing the pill 210, the computing device 110 may transmit an input command to the server system 130 (shown in FIG. 1) that prompts the server system 130 to retrieve a data visualization 302 that represents the "Rotation Program Analysis" performance topic from the visualization database 152 (FIG. 1). The client computing device 110 receives the data visualization 302 from the server system 130 via the network 112 (FIG. 1), and displays the data visualization 302 in the large work space 226. Because there is only one large work space 226 in the illustrated embodiment, subsequent selection (e.g., via drag-and-drop, single click, double-click, etc.) of another pill 210 from the second flyout menu 214 may cause the computing device 110 to replace the current data visualization 302 in the large work space 226 with a different data visualization 302.

Figure 6:
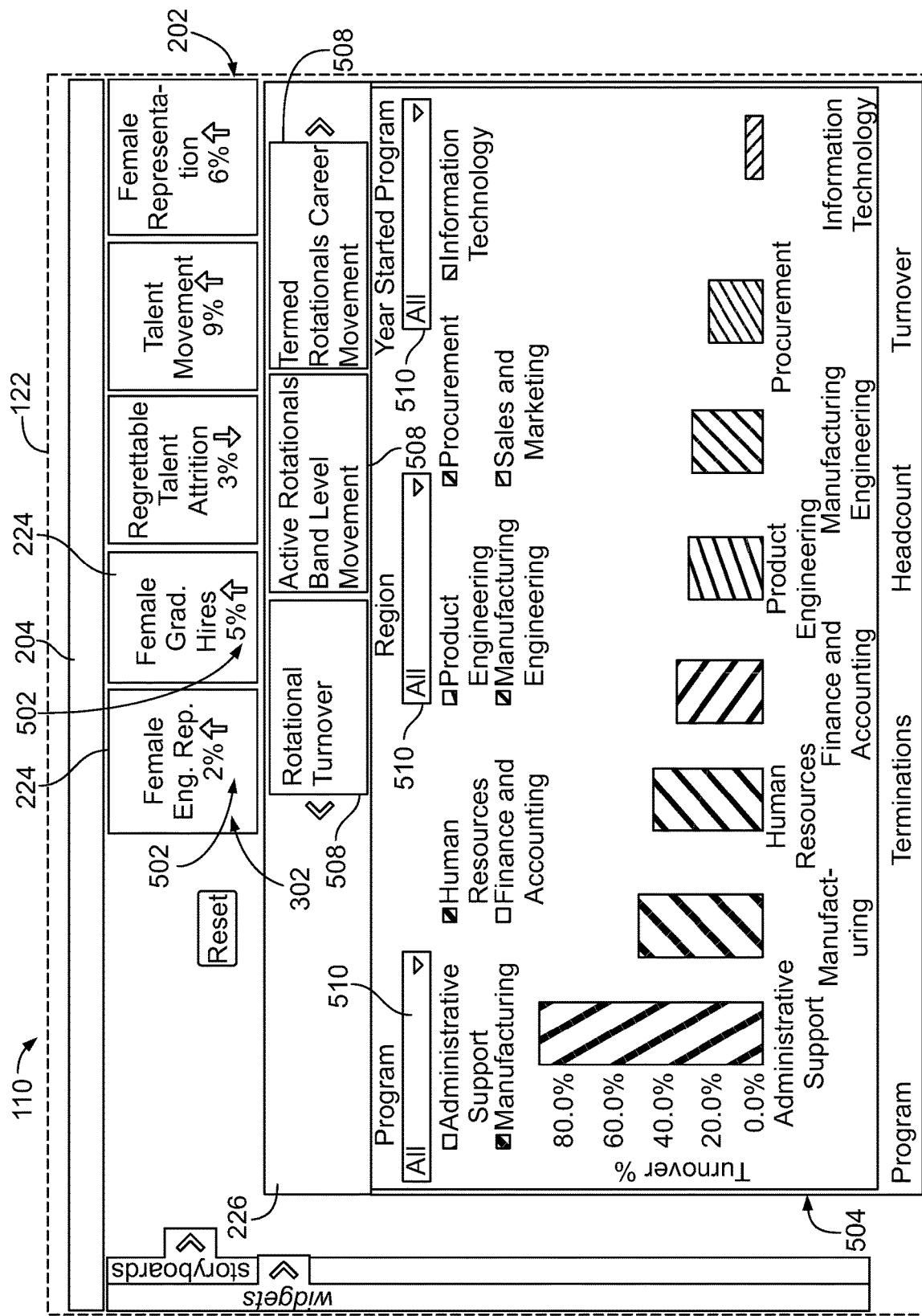
FIG. 6 shows the display screen of the client computing device displaying the user interface with multiple data visualizations.

FIG. 6 shows the display screen 122 of the client computing device 110 displaying the user interface 202 with multiple data visualizations 302. The data visualizations 302 within the small work spaces 224 are represented as data metrics 502. The data visualization 302 within the large work space 226 is an analytical dashboard 504 that includes at least one collection of data points. The analytical dashboard 504 in FIG. 6 includes a bar graph 506 showing "Rotational Turnover." The analytical dashboard 504 has multiple available graphical representations for viewing the data, such as tables, line graphs, pie charts, scatter plots, and the like. The user can navigate the analytical dashboard 504 to view different graphical representations by selecting different tabs 508 using the input device 123 (shown in FIG. 1). The user can also view filter the data that is presented in the graphical representations using dropdown menus 510. The client computing device 110 may receive the analytical dashboard 504 from the server system 130 (shown in FIG. 1), which retrieves the dashboard 504 from the visualization database 152 (FIG. 1). The client computing device 110 is configured to allow the user to navigate through the different data and graphical representations of the dashboard 504 without involvement from the server system 130. For example, the one or more processors 126 of the computing device 110 render and rearrange the dashboard 504 on the user interface 202 responsive to user input commands.

In FIG. 6, the client computing device 110 operating the data analytics program 204 concurrently displays five different data metrics 502 and one analytical dashboard 504 on the user interface 202. The client computing device 110 is configured to render and display each of the data metrics 502 and the dashboard 504 in different discrete areas of the interface 202 for organized, efficient consumption (e.g., viewing) by the user. For example, the user is able to quickly and efficiently view and compare the information presented by the data metrics 502 and the analytical dashboard 504 without rendering errors, rendering delays, and without switching between different browsers, windows, and/or tabs, unlike known data analytics programs.

Figure 7:
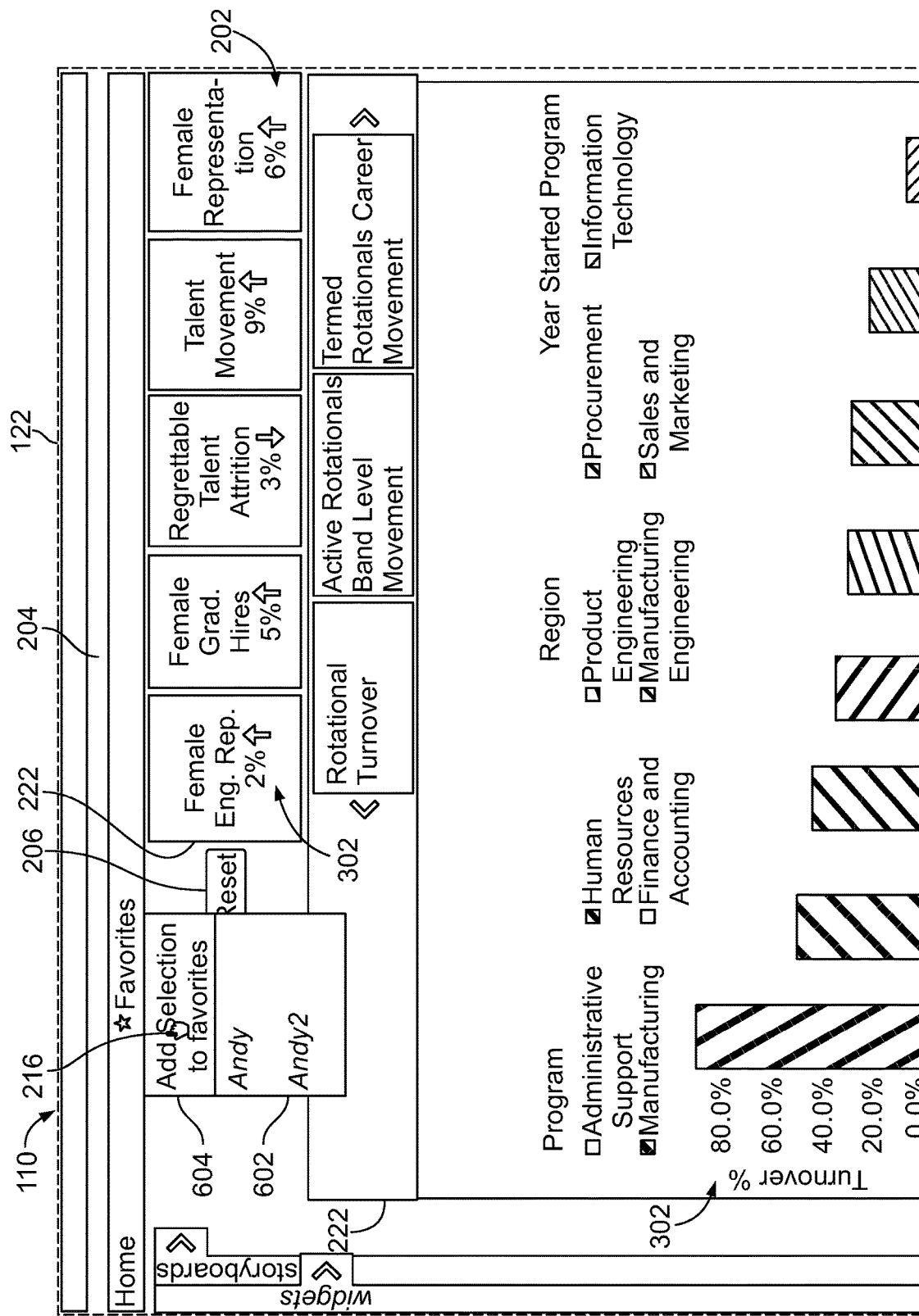
FIG. 7 shows the display screen of the client computing device displaying the user interface as shown in FIG. 6 with a favorite window open.

FIG. 7 shows the display screen 122 of the client computing device 110 displaying the user interface 202 as shown in FIG. 6 with a favorite window (e.g., "Favorites") 602 open. The user can access the favorite window 602 by moving the cursor 216 utilizing the input device 123 (shown in FIG. 1). The favorite window 602 allows the user to save the current settings for future access without individually selecting each of the pills 210 (shown in FIGS. 3 through 5). For example, upon selecting the "Add Selections to Favorites" link 604, the client computing device 110 may communicate the current settings to the server system 130 (FIG. 1), which saves the settings in the user database 150 (FIG. 1) as favorite settings within user preferences associated with the user. By updating the favorite settings, the particular performance topics that are represented by data visualizations 302 currently displayed on the user interface 202 are identified and stored as favorites.

During a subsequent session, the server system 130 optionally may retrieve the favorite settings from the user database 150 upon receiving the user login. The server system 130 may automatically retrieve the data visualizations 302 that represent the favorite settings, and may transmit the data visualizations 302 to the client computing device 110. The client computing device 110 may automatically populate the work spaces 222 on the user interface 202 with the data visualizations 302. Therefore, the user is initially presented with the favorited data visualizations 302 upon login. Alternatively, the server system 130 does not retrieve the favorite settings from the user database 150 initially, so the user is initially presented with the blank user interface 202 shown in FIG. 2. The server system 130 waits until receiving a user input command that selects one of the saved favorite settings before retrieving the corresponding data visualizations 302 that represent the favorite settings from the visualization database 152.

Optionally, the user database 150 may also store user history settings. For example, the user database 150 may store a record of the performance topics that are selected for viewing during a session. Optionally, upon receiving a user login during a subsequent session, the server system 130 may automatically access the user history settings from the user database 150, and may retrieve the data visualizations 302 that represent performance topics selected during a previous session.

At any time during the session, the user can select the reset button 206 to clear the data visualizations 302 from the work spaces 222.

Figure 8:
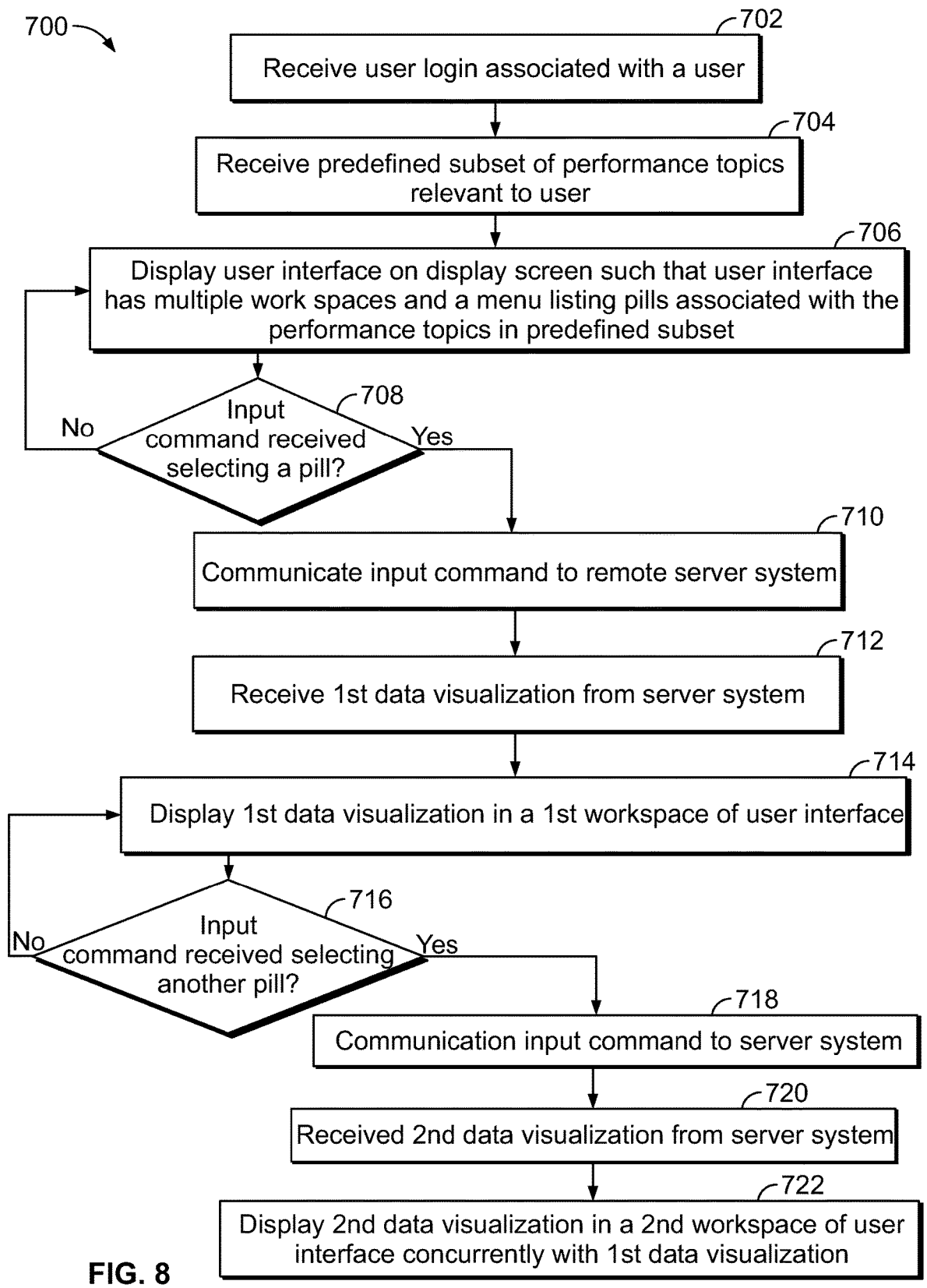
FIG. 8 is a flow chart of a method for providing access to data visualizations according to an embodiment of the present disclosure.

FIG. 8 is a flow chart of a method 700 for providing access to data visualizations according to an embodiment of the present disclosure. The method 700 may be performed in whole or at least in part by the one or more processors 126 (shown in FIG. 1) of one of the client computing devices 110. Referring to FIGS. 1-7, the method 700 begins at 702, at which a user login is received that is associated with a specific user, such as an employee of a business. The user login may be received via an input device 123, such as a touchscreen, a touchpad, a keyboard, a mouse, or the like.

At 704, a predefined subset of performance topics that are designated as relevant to the user and appropriate for the user is received based on the user login. For example, a remote server system 130 may access a user database 150 to look up information about the user, and may select a subset of performance topics that appear to be relevant to the user and appropriate based on the information, such as employment position, employment department, security clearance, etc. The predefined subset of performance topics may be transmitted to a client computing device 110 from the server system 130.

At 706, a user interface 202 is displayed on a display screen 122 of the client computing device 110. The user interface 202 may be received from the server system 130 with the predefined subset of performance topics. The user interface 202 has multiple work spaces configured to display data visualizations 302 that represent performance topics. The user interface 202 also has a menu 208 that lists or contains pills 210, which are virtual objects associated with the different performance topics in the predefined subset. The user interface 202 does not display any pills 210 associated with performance topics outside of the predefined subset.

At 708, a determination is made whether an input command is received that selects one of the pills 210. The pill 210 may be selected via a drag-and-drop function into one of the work spaces 222, and/or by another designated function such as a single click, single touch input, a double-click, or a double touch input.

If no input command is received selecting a pill 210, then flow returns to 706. If, on the other hand, an input command is received selecting a pill 210, then the method 700 proceeds to 710 and the input command is communicated remotely to the server system 130. The server system 130 may access a visualization database 152 to retrieve a first data visualization 502 that represents the performance topic associated with the selected pill 210.

At 712, the first data visualization 502 is received at the client computing device 110 from the server system 130 via a network 112. At 714, the first data visualization 502 is displayed in a first work space 224 of the user interface 202. In an embodiment, the first data visualization 502 is a data metric, and the first work space 224 is one of multiple small work spaces 224 on the user interface 202.

At 716, a determination is made whether another input command is received that selects another one of the pills 210 in the menu 208. If not, flow of the method 700 returns to 714. But if another input command is indeed received, then flow proceeds to 718 and the input command is again communicated to the server system 130 for the server system 130 to retrieve a second data visualization 504 from the visualization database 152. At 720, the second data visualization 504 is received at the client computing device 110 from the server system 130. At 722, the second data visualization 504 is concurrently displayed on the user interface 202 with the first data visualization 502. The second data visualization 504 is displayed in a second work space 226 that is separate from the first work space 224 that displays the first data visualization 502. For example, the second data visualization 504 may be an analytical dashboard which is displayed 224 in a large work space 226 on the user interface 202.

The method 700 may be at least partially repeated to concurrently display multiple different data metrics 502 and analytical dashboards 504 on the user interface 202. The information provided on the user interface 202 is selected by the user out of the predefined subset of performance topics that are customized and personalized for the specific user to improve efficiency and enable better access to desirable data analytics.

As used herein, numerical terms such as "first," "second," and "third" preceding components are only to distinguish between the components in order to describe the components, and are not intended to denote priority, location, order, or the like. For example, reference to a first data visualization 302 is not limited to only one specific data visualization 302 in all embodiments. Unless otherwise specified, reference to a first data visualization in the claims may refer to any of the data visualizations described herein, including the data metrics 502 and the analytical dashboards 504, and the same is true for reference to a second data visualization, a third data visualization, etc.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A method comprising:
   associating, by a processor, a log in of a user with at least one of user employment status, position, department or security clearance;
   customizing, by the processor, at least one of multiple pills, a first performance topic or a second performance topic to be relevant to the user, based on the at least one of user employment status, position, department or security clearance from the log in of the user;
   classifying, by the processor, the multiple pills into different headings within a menu;
   receiving, by the processor, a selection of a first heading of different headings that are located in the menu;
   displaying, by the processor, a subset of the pills from the multiple pills, wherein the subset of pills is selected based on being associated with the first heading;
   receiving, by the processor, a selection of a first pill of the subset of the pills from the menu and multiple performance topics relevant to the user, wherein the first pill comprises a widget having the first performance topic represented as data metrics with a single type of data;
   receiving, by the processor, a drag and drop of the widget from the menu to a first work space;
   determining, by the processor, that the first work space of a plurality of first work spaces is full;
   displaying, by the processor, a first data visualization representing the first performance topic with the data metrics in a next available first work space of the plurality of first work spaces, in response to the receiving the drag and drop into the first work space of the widget, wherein the first work space only displays the data metrics;
   displaying, by the processor, the first data visualization as a replacement of another data visualization in the first work space, in response to all of the plurality of first work spaces being occupied;
   receiving, by the processor, a selection of a second pill from the menu having multiple pills, wherein the second pill comprises an analytical dashboard having the second performance topic;
   receiving, by the processor, a drag and drop of the second pill from the menu to a second work space;
   displaying, by the processor and concurrently with the first data visualization, a second data visualization representing the second performance topic in the second work space, in response to the receiving the drag and drop into the second work space, wherein the second data visualization is an analytical dashboard including a collection of multiple data points; and
   interpreting, by the processor, a drag and drop into the second work space as a cancellation, in response to receiving a drag and drop of a third pill from the menu to the second work space.

2. The method of claim 1, further comprising concurrently displaying, by the processor, multiple data visualizations representing multiple performance topics in the first work space.

3. The method of claim 1, wherein the first data visualization is a pre-built, dynamic analytical dashboard from a visualization database.

4. The method of claim 1, wherein the pill is a virtual object.

5. The method of claim 1, wherein the pill is at least one of a widget or a storyboard.

6. The method of claim 1, wherein the multiple pills in the menu comprise at least one of widgets within a first flyout menu or storyboards within a second flyout menu.

7. The method of claim 1, wherein the first work space is one of a plurality of first work spaces in a row above the second work space.

8. The method of claim 1, further comprising retrieving, by the processor, the first data visualization from a visualization database remote from a client computing device of the user.

9. The method of claim 1, further comprising obtaining, by the processor, the first data visualization based on at least one of a favorites setting or a user history setting.

10. The method of claim 1, further comprising displaying, by the processor, a third data visualization in the second work space by replacing the second data visualization in the second work space.

11. The method of claim 1, further comprising changing, by the processor, a view of a third data visualization, in response to at least one of a selection of a tab or filtering of data using a drop down menu, and without involvement of a server system.

12. The method of claim 1, further comprising concurrently displaying, by the processor, multiple data metrics in each of a plurality of first work spaces, respectively and one analytical dashboard in the second work space.

13. A system comprising:
    a processor; and
    a tangible, non-transitory memory configured to communicate with the processor,
    the tangible, non-transitory memory having instructions stored thereon that, in response to execution by the processor, cause the processor to perform operations comprising:
    associating, by the processor, a log in of a user with at least one of user employment status, position, department or security clearance;
    customizing, by the processor, at least one of multiple pills, a first performance topic or a second performance topic to be relevant to the user, based on the at least one of user employment status, position, department or security clearance from the log in of the user;
    classifying, by the processor, the multiple pills into different headings within a menu;
    receiving, by the processor, a selection of a first heading of different headings that are located in the menu;
    displaying, by the processor, a subset of the pills from the multiple pills, wherein the subset of pills is selected based on being associated with the first heading;
    receiving, by the processor, a selection of a first pill of the subset of the pills from the menu and multiple performance topics relevant to the user, wherein the first pill comprises a widget having the first performance topic represented as data metrics with a single type of data;
    receiving, by the processor, a drag and drop of the widget from the menu to a first work space;
    determining, by the processor, that the first work space of a plurality of first work spaces is full;
    displaying, by the processor, a first data visualization representing the first performance topic with the data metrics in a next available first work space of the plurality of first work spaces, in response to the receiving the drag and drop into the first work space of the widget, wherein the first work space only displays the data metrics;

displaying, by the processor, the first data visualization as a replacement of another data visualization in the first work space, in response to all of the plurality of first work spaces being occupied;

receiving, by the processor, a selection of a second pill from the menu having multiple pills, wherein the second pill comprises an analytical dashboard having the second performance topic;

receiving, by the processor, a drag and drop of the second pill from the menu to a second work space;

displaying, by the processor and concurrently with the first data visualization, a second data visualization representing the second performance topic in the second work space, in response to the receiving the drag and drop into the second work space, wherein the second data visualization is an analytical dashboard including a collection of multiple data points; and interpreting, by the processor, a drag and drop into the second work space as a cancellation, in response to receiving a drag and drop of a third pill from the menu to the second work space.

\* \* \* \* \*